United States Patent [19]

Lunden et al.

[11] 4,225,656

[45] Sep. 30, 1980

[54] SOLID ELECTROLYTE FOR ELECTROMECHANICAL CELLS AND METHOD FOR THE PRODUCTION THEREOF

[76] Inventors: Arnold Lunden, Laangedragsvaegen 114, Vaestra Froelunda; Bjorn Heed, Utlandagatan 19, Goeteborg; Arnold J. L. Kvist, Roennbaersvaegen 16, Ronneby, all of Sweden

[21] Appl. No.: 862,098

[22] Filed: Dec. 19, 1977

Related U.S. Application Data

[63] Continuation of Ser. No. 730,448, Oct. 7, 1976, abandoned, and Ser. No. 590,116, Jun. 25, 1975, abandoned, which is a continuation-in-part of Ser. No. 466,508, May 2, 1974, abandoned.

[51] Int. Cl.$^2$ ............................................. H01M 6/18
[52] U.S. Cl. .................................... 429/191; 29/623.1
[58] Field of Search ....................... 429/191; 29/623.1

[56] References Cited

U.S. PATENT DOCUMENTS

| | | | |
|---|---|---|---|
| 2,852,591 | 9/1958 | Ruben | 429/191 |
| 3,201,736 | 8/1965 | Ovshinsky | 117/227 |
| 3,506,492 | 5/1968 | Buzzelli et al. | 429/191 |
| 3,726,718 | 4/1973 | Mellors | 252/62.2 |

Primary Examiner—Donald L. Walton
Attorney, Agent, or Firm—Burns, Doane, Swecker & Mathis

[57] ABSTRACT

Electrochemical cells are provided having solid electrolytes of enhanced conductivity at low temperatures. These electrolytes comprise binary and ternary mixtures of salts having the compositions—$M_2SO_4$—$(Me)_xSO_4$ or $M_2SO_4$—$(Me)_xSO_4$=$M_yX$, respectively where M is—an ion of an alkali metal, Ag, or a mixture thereof, Me is an ion of a divalent metal or Ag, x is 1 or 2, x being 1 when Me is a divalent metal ion and 2 when Me is Ag, X is a halogen or sulfate ion, and y is 1 or 2, y being 1 when X is halogen and 2 when X is sulfate. In addition to having a high conductivity at lower operating temperatures, the phases are stable at least 100° C. above the transformation points.

28 Claims, 3 Drawing Figures

THE PHASE DIAGRAM OF THE
SYSTEM $Li_2SO_4$ - $MgSO_4$ (Tä 1)

PHASE I IS CONDUCTIVE

THE PHASE DIAGRAM OF THE SYSTEM $Li_2SO_4 - MgSO_4$ (Tä 1)

PHASE I IS CONDUCTIVE

THE PHASE DIAGRAM OF THE SYSTEM $Li_2SO_4 - ZnSO_4$ (Tä 2)

PHASES I and III ARE CONDUCTIVE

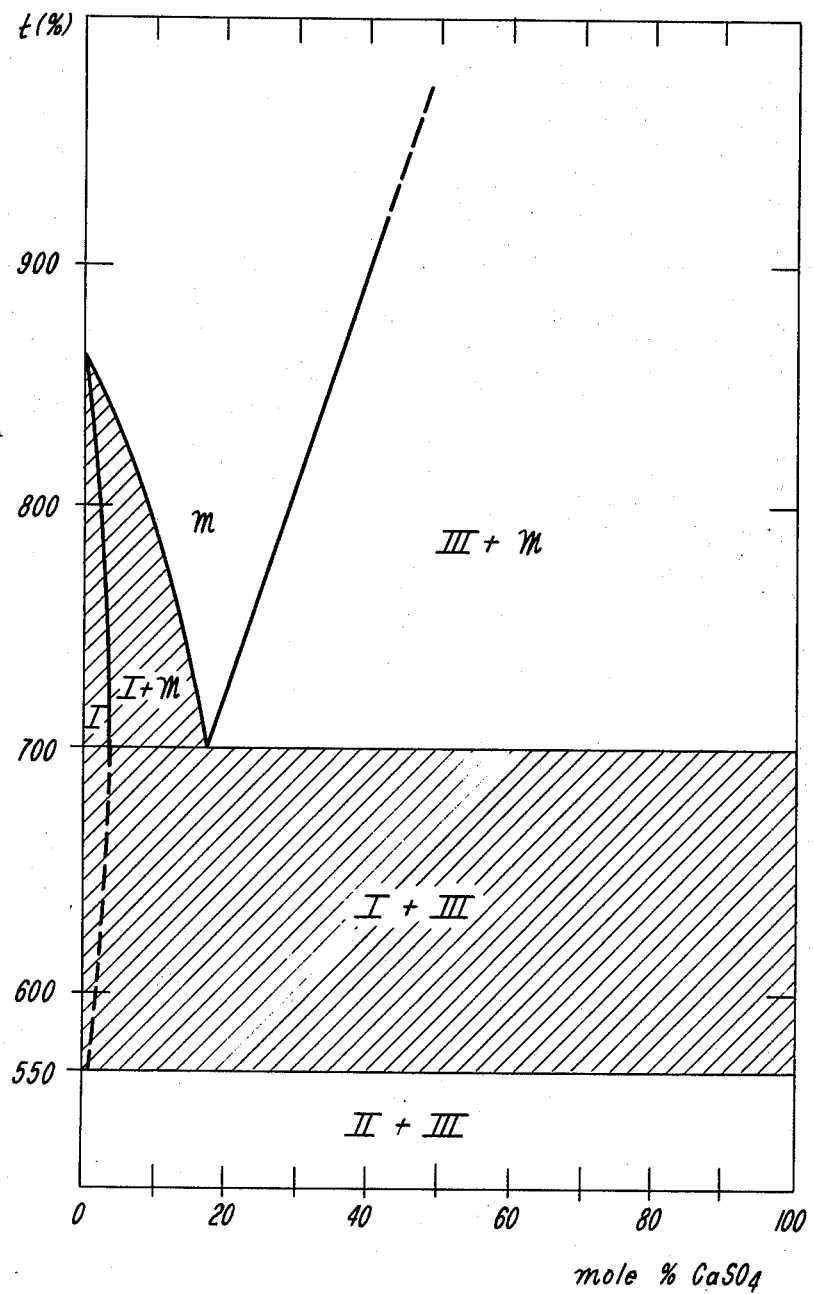

SOLID ELECTROLYTE FOR ELECTROMECHANICAL CELLS AND METHOD FOR THE PRODUCTION THEREOF

This is a continuation of application Ser. No. 730,448 filed Oct. 7, 1976 and Ser. No. 590,116 filed June 25, 1975 both now abandoned, which is a continuation-in-part of 466,508 filed May 2, 1974 now abandoned.

The present invention relates to electrochemical cells. More particularly, it relates to electrochemical cells having solid electrolytes of enhanced conductivity at lower operating temperatures than have been possible with previously available cells, which electrolytes have the further desirable characteristic that the phases remain stable at least 100° C. above their transformation points.

The invention likewise relates to a process for production of cells having solid electrolytes of this kind.

In recent years, extensive work has been done to develop batteries suitable for vehicles of various sorts, such as automobiles, trains, etc. A first requirement for such a battery is high energy and current density, and therefore high temperature batteries have proved to be especially well suited, whereby, as electrolyte, use is made either of molten salts or of solid electrolytes that function within a temperature range where the electrolyte has good ionic conductivity without going over into the molten state. To avoid or to reduce to a minimum the expensive devices for heating and insulation of the batteries, an effort has been made to attain the greatest possible ionic conductivity at the lowest possible temperatures.

Electrochemical cells for high temperatures entail material problems that are hard to master, though. Furthermore, the materials that make up the electrolyte may be very easy to obtain and inexpensive for more general use.

Many types of solid electrolytes are known; for example, Swedish Pat. Nos. 333,420; 333,176; and 336,177 describe solid electrolytes consisting of double or triple aluminum oxides, with an alkali metal and possibly an additional metal that is at the most divalent. These electrolytes have a maximum conductivity of $1.3 \times 10^{-3}$ (ohm$\times$cm)$^{-1}$ at 25° C. and $3.6 \times 10^{-2}$ at 300° C.

It is further known that various iodides can be used as solid electrolytes, and such an electrolyte of the composition 4LiI-NH$_4$I with an indicated conductivity of $2 \times 10^{-6}$ (ohm$\times$cm)$^{-1}$ at room temperature is described in U.S. Pat. No. 3,513,027. A conductivity of this order of magnitude is much too low, however, for use of the electrolyte in high load cells. A significantly better conductivity, of the order of magnitude of $2 \times 10^{-1}$ (ohm$\times$cm)$^{-1}$ at room temperature, is obtained in solid electrolytes of the type MAg$_4$I$_5$,MAg$_3$I$_4$, where M is K, Rb, NH$_4$, and possibly Cs. These electrolytes are described, for example, in Swedish Pat. Nos. 319,222; 319,223; and 319,542, as well as in U.S. Pat. Nos. 3,503,810 and 3,558,357. It is primarily the rubidium version of this electrolyte that has come into practical use. Electrolytes of this kind are expensive to manufacture, however, and they do not yield high current densities. They are not thermodynamically stable, either, and besides they are hygroscopic, for which reason the cell has to be potted to avoid penetration of moisture.

About ten years ago, various high temperature modifications with high conductivities became known among the sulfates, expecially Li$_2$SO$_4$, which forms a face-centered cubic (f.c.c.) phase with comparatively arranged sulfate lattice and low transformation point 572° C., Li$_2$SO$_4$—Na$_2$SO$_4$ which, in equimolar mixture, forms a body-centered cubic (b.c.c.) phase with more disordered lattice than Li$_2$SO$_4$, and Li$_2$SO$_4$-Ag$_2$SO$_4$ similar b.c.c. phase like the former, and a lower transformation point at 415° C. U.S. Pat. Nos. 3,506,490 and 3,506,491 further describe a solid electrolyte consisting of a lithium sulfate and lithium halide such as chloride or bromide or mixtures of these. The working temperature is of the order of magnitude of 400° C. According to U.S. Pat. No. 3,506,492, approximately the same working temperature, of 400° C. is attained by mixing lithium sulfate in the solid electrolyte with alkali halides such as Li, K, Cs, Na or Rb chlorides or bromides. It is to be noted thus that the selection of cations is limited to alkali ions.

Four properties are especially important where applications of electrochemical systems with solid electrolytes are concerned, namely high conductivity, high energy per unit of weight and volume, low transformation point, and low cost. It is of great importance that ions that have high mobility in the electrolyte can be considered since this influences the electrode combinations. To find suitable compositions with the above properties, therefore, we have investigated the transport properties and structure of a number of pure sulfates and a large number of binary and ternary salt mixtures.

A primary object of the present invention is to provide an electrochemical cell having a solid electrolyte of high conductivity.

It is also an object of this invention to provide such a cell in which the solid electrolyte has a high conductivity at lower transformation points and operating temperatures than the temperatures required for previously available electrolytes.

Another object of the present invention is to provide a thermodynamically stable electrolyte which will remain stable at temperatures at least as high as 100° C. above the transformation point.

Still another object of this invention is to provide a solid electrolyte which is not hygroscopic and thus avoids the penetration of moisture.

A further object is to provide a solid electrolyte which becomes sticky upon being heated to the softening point, whereby electrodes can be securely and effectively attached.

These and other objects which will become apparent to those skilled in the art are achieved in accordance with the present invention as described below.

In order that the invention be more readily understood, reference is made to the accompanying drawings in which:

FIG. 3 is a phase diagram of the system Li$_2$SO$_4$—CaSO$_4$.

Since lithium sulfate has very high conductivity and is also inexpensive, it is very suitable as an electrolyte component. Lithium sulfate is certain situations can, however, advantageously be replaced by Na$_2$SO$_4$ or Ag$_2$SO$_4$ (see below). The selection of components, moreover, is strongly dependent upon the intended use of the electrolyte. In certain situations, it is essential to include mobile cations other than alkali ions, the only ones indicated in U.S. Pat. Nos. 3,506,490; 3,506,491; and 3,506,492, since it then becomes possible to use e.g., magnesium or zinc electrodes. In other situations, the working temperature is of greatest importance. Then, the attempt can be made either to lower the transformation point by addition of various salts to the lithium sulfate, or to find new systems with lower transformation points for the highly conductive state. Obviously, the highest possible conductivity is sought.

It has thus turned out that with solid sulfates as a base, it was possible to obtain solid electrolytes with better conductivity at lower temperatures than had previously been possible. This occurs, according to the invention, in that the electrolytes contain a mixture of at least two solid sulfates plus possibly at least one solid salt, sulfate and/or halide.

Thus, in accordance with one aspect of the present invention, cells having solid electrolytes are provided in which the electrolytes have the composition $M_2SO_4$—$(Me)_xSO_4$, where M is an ion of an alkali metal, Ag, or mixtures thereof, Me is an ion of a divalent metal or Ag, and x is 1 or 2, x being 1 when Me is divalent and 2 when Me is Ag. To satisfy the requirement stated above, that the electrolytes contain a mixture of at least two solid sulfates, M and Me cannot both be Ag at the same time.

In accordance with another aspect of the invention, cells are provided in which the electrolytes have the composition $M_2SO_4$—$(Me)_xSO_4$—$M_yX$, where M, Me, and X have the same meaning as above, X is halogen or sulfate, and y is 1 or 2, y being 1 when x is halogen and 2 when X is sulfate. As in the case of the aspect discussed above, it will be obvious that M and Me cannot both be Ag at the same time for the same reasons.

Figure 1:
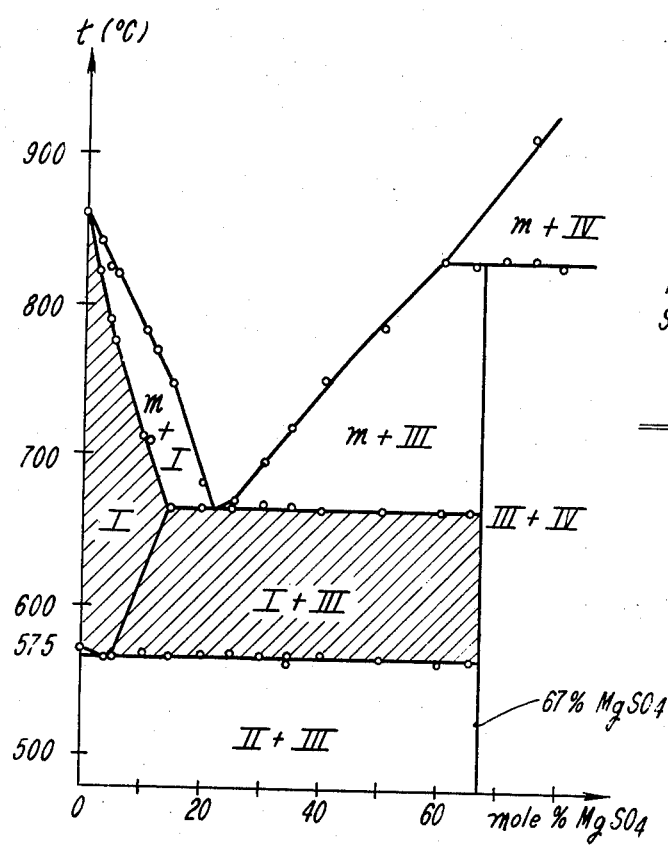
FIG. 1 is a phase diagram showing the conductivity of the system Li$_2$SO$_4$—MgSO$_4$.
Figure 2:
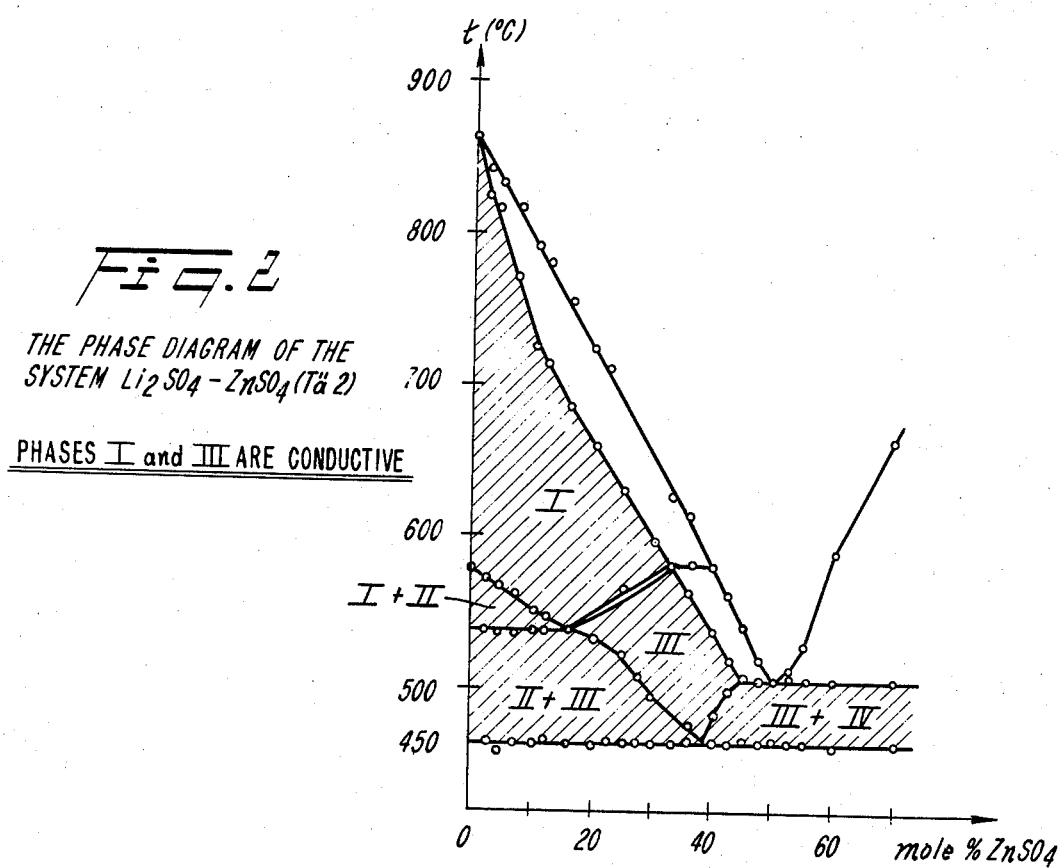
FIG. 2 is a phase diagram of the system Li$_2$SO$_4$—SnSO$_4$.

For binary systems, it often happens that about 10–20 mole percent of a univalent and divalent salt is soluble in a lithium sulfate f.c.c. phase, and this normally affects conductivity only insignificantly while the transformation point is lowered. In the comprehensive study of various binary systems, a number of binary systems with high conductivity that were not previously known were discovered, as described below: (a) In the $Li_2SO_4$—$ZnSO_4$ system as seen in FIG. 2, there was found a phase, III (shaded portion) that resembles the b.c.c. phase in $Li_2SO_4$—$Na_2SO_4$ and $Li_2SO_4$—$Ag_2SO_4$, and that has the same high conductivity as phase I. However, the structure is not cubic but presumably orthorhombic. (b) In $Li_2SO_4$—$MgSo_4$, as seen in FIG. 1, there was found a highly conductive zone phase I (shaded), even up to 67 mole percent $MgSO_4$, where within great parts of this range there is a two phase zone, with a mixture of f.c.c. $Li_2SO_4(Mg)$ and $Li_2Mg_2(SO_4)_3$. In the system $Li_2SO_4$—$CaSO_4$ shaded portion of FIG. 3, the two phase zone instead comprises a mixture of f.c.c. $Li_2SO_4(Ca)$ and $CaSO_4$. Phase I is conductive. (c) $NaSO_4$—$MgSO_4$, $Na_2SO_4$—$ZnSO_4$, $K_2SO_4$—$ZnSO_4$ and $Ag_2SO_4$—$MgSO_4$ may be mentioned as examples of binary highly conductive systems where $Li_2SO_4$ has been replaced with another sulfate with a univalent cation.

We also conducted a closer study of the system $Li_2SO_4$—$LiCl$ where it turned out that there is high electric conductivity above 475° C. In this system, we found that it is possible to increase the conductivity in the f.c.c. phase by up to a factor of 3 by addition of LiCl to $Li_2SO_4$, whereby the consistency remains quite solid in spite of the fact that it is here a question of a mixed phase (solid+molten).

The binary systems studies thus revealed the existence additionally of a number of salt combinations with high conductivity, and this has been very useful for work with ternary systems.

Although the binary systems meet the requirements for high conductivity, high energy per unit of weight or volume, and low cost, the phases are formed at relatively high temperatures. By combinations of various salt mixtures, however, we succeeded in lowering the transformation temperatures and in this way came out with temperatures below 100° C., having transformation points and being conductive at temperatures as low as about room temperature.

The preferred electrolytes according to this invention comprise the ternary systems described in greater detail below.

The preferred electrolytes that reached the lowest transformation points are of the type that can be represented $LiAgX(SO_4)$ where X=Cl, Br, I or a combination of these substances. Salts of this type are mechanically very attractive: they are like glass, tough and sticky, making it very easy to make electric contacts. We may compare electrolytes of this type with stabilized zirconium dioxide, for example. One of the new electrolytes can thus be called, for example, AgI-stabilized $LiAgSO_4$.

The conductivity in pure hexagonal (h.c.p.) $Na_2SO_4$ (237°–890° C.) is significantly lower than in the case of pure f.c.c. $Li_2SO_4$ at the same temperature, but a significant increase in conductivity in the hexagonal phase can be attained by mixing in another sulfate, whereby either univalent or multivalent cations can be selected. $CaSO_4$, $MgSO_4$, and $ZnSO_4$ may be mentioned as suitable additions. Binary mixtures with high $Na_2SO_4$ content thus have a significant conductivity down to about 200° C.

Below there is presented, in Table I, a summary of some high conduction solid sulfates and sulfate systems with their lower transformation points, according to the present invention. The phases are stable at least 100° C. above he transformation point. The novelty of systems 1–7 lies among other things, in the introduction of a divalent cation, Ca, Mg, Zn, while in cases 3, 4 and 7, $Li_2SO_4$ was replaced by another univalent metal salt. The others, 8–14, have lower transformation points, lower than those for previously known sulfate electrolytes. Other systems and compositions are given in the examples subsequently set forth.

TABLE I

| Salt | Lower Transformation Point in °C. |
| --- | --- |
| 1. $Li_2SO_4$—$CaSO_4$ | 565 |
| 2. $Li_2SO_4$—$MgSO_4$ | 565 |
| 3. $Na_2SO_4$—$ZnSO_4$ | 500 |
| 4. $K_2SO_4$—$ZnSO_4$ | 480 |
| 5. $Li_2SO_4$—$Na_2SO_4$—$MgSO_4$ | 475 |
| 6. $Li_2SO_4$—$ZnSO_4$—$LiCl$ | 420 |
| 7. $Ag_2SO_4$—$MgSO_4$ | 420 |
| 8. $Li_2SO_4$—$Ag_2SO_4$—$MgSO_4$ | 385 |
| 9. $Li_2SO_4$—$Ag_2SO_4$—$Na_2SO_4$ | 340 |
| 10. $Li_2SO_4$—$Ag_2SO_4$—$ZnSO_4$ | 330 |
| 11. $Li_2SO_4$—$Na_2SO_4$—$ZnSO_4$ | 325 |
| 12. $Li_2SO_4$—$Ag_2SO_4$—$AgCl$ | 300 |
| 13. $Li_2SO_4$—$Ag_2SO_4$—$AgBr$ | 260 |
| 14. $Li_2SO_4$—$Ag_2SO_4$—$AgI$ | 100 |

In general in accordance with this invention, electrolytes having the high conductivities and low transformation points can be obtained using about 5% to 92.5% alkali metal, about 7.5% to 36% divalent metal, about 15% to 20% $Ag_2SO_4$, and about 15% to 20% $Ag_2I_2$.

By suitable selection of the salt mixture as above, it is thus generally possible, within the scope of the invention, to arrive at any low transformation point within the range 572°–100° C. The lower limit for the lower transformation point in solid sulfate electrolytes according to the invention certainly is substantially lower than what the above table indicates, however. It is to be noted that the electrolytes in different cases retain a high conductivity even below the transformation point if they are cooled very rapidly, or if they have been converted to a highly conductive phase by pressure treatment.

The low transformation points as we have noted cannot be regarded as supercooling phenomena. The phases are formed and transformed at both rising and falling temperatures, and furthermore they are resistant. The mechanism behind the conduction transport is very complicated and not yet fully understood. The electrolyte can be considered to be composed of a sulfate matrix in which the sulfate ions have great possibilities of rotation. The energy differences for different positions that can be occupied, for example by the lithium ions, are only fractions of an electron volt. In a $Li_2SO_4$—$Ag_2SO_4$ high conducting system, the relative mobilities are just about the same for Li and Ag ions.

The diffusion coefficients of different ions are relatively independent of the salt mixture and they are:
for univalent ion—$10^{-5} cm^2/sec$
for divalent cations—$10^{-6} cm^2/sec$
for trivalent cations—$10^{-8} cm^2/sec$
for univalent anions—$10^{-6} cm^2/sec$
for sulfate ions—$10^{-9} cm^2/sec$ It has been shown that solid electrolytes according to the invention have many worthwhile properties as opposed to the solid electrolytes that have been known heretofore. Thus, the sulfate electrolytes of the invention are not hygroscopic. The materials are easily worked at room temperature and can be produced in thin layers and for instance polished. In the high temperature phase, the materials are sticky and give very good contact with adjacent electrodes. The electrolytes can be heated and cooled, and the transformation point can be passed repeatedly without damage to the material. Freedom of choice in the matter of electrode material is great in cells with these solid electrolytes. Finally, it should be noted that, in spite of the fact that many of the electrolytes listed as examples in the table contain silver, this is cheaper, in comparison, than earlier known and used electrolytes.

Three different methods have been used for electrolyte preparation. A molten mixture was allowed to stiffen. A second method was to press a tablet, which was heated to a temperature in the range of stability of the phase in question. In both these methods, in certain cases, a high conductivity could be retained by fast cooling, below the point of transformation. The conductivity at room temperature is then a few powers higher than in the untreated mixture. In the third method, strong increase of conductivity is attained solely by the pressing of tablets at room temperature.

The following examples illustrate the production of solid electrolytes.

The indicated percentages relate to equivalent percent.

EXAMPLE 1

A mixture of 70% $Li_2SO_4$, 15% $Ag_2SO_4$ and 15% $Ag_2I_2$ is pressed to a tablet with a height of 4 mm and a diameter of 13 mm. The resistivity of the pressed tablet is measured at 23.5 kilo ohms at room temperature. The tablet is heated to 325° C. and fast cooled to −20° C. The measured resistance at room temperature was now ca 100Ω. By heat treatment, the conductivity had thus increased from $8\times10^{-7}$ to $2\times10^{-3}$ $(ohm\ cm)^{-1}$, i.e., about 250 times.

EXAMPLE 2

A mixture of 50% $Li_2SO_4$, 20% $Ag_2SO_4$, 20% $Ag_2I_2$ and 10% $MgSO_4$ is compressed to a tablet with a height of 5 mm and a diameter of 13 mm, with a pressure of 8 tons/$cm^2$. The resistivity of the tablet at room temperature (without heat treatment of the tablet) was 325Ω.

The solid electrolytes of the invention have been used in various cells, and the following examples indicate complete cell constructions.

EXAMPLE 3

HgO—Mg

As anode there was used here a magnesium strip about 3 cm long and 3 mm wide rolled into a spiral, and as cathode, yellow mercuric oxide. The surface of the cathode was about 1 $cm^2$. The electrolyte had a composition corresponding to $Li_{1.72}Mg_{0.14}SC_4$, i.e., 86 mole percent $Li_2SO_4$ and 14 mole percent $MgSO_4$. At 600° C., this cell could sustain 0.75 V over a resistance of 100 ohms.

EXAMPLE 4

$Ag_2O$—Mg

Anode, 5 cm×3 mm magnesium strip. Cathode, 1 $cm^2 Ag_2O$ mixed with silver wool. Electrolyte $Li_{1.44}Mg_{0.28}SO_4$, i.e., 72 mole percent $Li_2SO_4$ and 28 mole percent $MgSO_4$. At 600° C., the cell yielded 10 mA at 1 volt. The unloaded cell had a pole voltage of 2.0 volts.

EXAMPLE 5

Air—Mg

The cell consisted of a magnesium strip about 5 cm long, 3 mm wide pressed into a tablet of electrolyte of composition $Li_{1.44}Mg_{0.28}SO_4$, i.e., 72 mole percent $Li_2SO_4$ and 28 mole percent $MgSO_4$. On 1 $cm^2$ of the electrolyte, there was pressed fast a thin layer of silver powder (ca0.1 mm), which functioned as air electrode-cathode. This cell delivered at 600° C., for a few minutes, 10 mA at 1 molt and had a pole voltage of 1.6 volt in unloaded state.

EXAMPLE 6

$MnO_2$—Mg

The cell consisted of an electrolyte with composition $Li_{1.72}Mg_{0.14}SO_4$, i.e., 86 mole percent $LiSO_4$ and 14 mole percent $MgSO_4$. The anode was of magnesium powder mixed with electrolyte. The cathode was of manganese dioxide mixed with electrolyte. The whole cell was produced by compressions in a cycle in a hydraulic press, whereby the current takeup was also pressed in. The cell was cylindrical with a diameter of 20 mm and a height of 4.7 mm. Volume 1.5 $cm^3$. The pole voltage with open cell was 2.3 volt. Over a resistor of 2 ohms, the cell was capable of delivering 0.5 A (5 minutes).

EXAMPLE 7

The electrolyte consisted of $Li_2SO_4$, 64 mole percent, and $ZnSO_4$, 36 mole percent. As anode, there was used zinc powder mixed with electrolyte in weight proportions of 1:1 and, as cathode, $MnO_2$ mixed with electrolyte in weight proportions of 1:1. The cell was produced by single pressing in the hydraulic press to a diameter of 15.3 mm and a height of 8 mm. At 500° C. the cell yielded a voltage of 1.3 volts open, and could maintain 0.85 volts over a 100 ohm resistor.

The following examples concern cells made by compression of powder in a hydraulic press. The pressing apparatus, made of steel, was charged with powder and powder mixtures in various parallel layers so that a complete cylindrical cell was formed in a single pressing. The diameter of the cells was 20 mm and the thickness 3–6 mm, depending upon the quantities of powder that were utilized.

Compression pressure was 2–3 kbar. In certain cases, silver wires were introduced through holes in the compression tool. The wires were thereby pressed firmly into the anode and cathode layers, respectively, and constituted current take-ups and contact poles. In other cases, the cell was only clamped fast in testing between silver wires which there served the same purpose.

All cells were tested in the furnace in ordinary atmospheric air without encapsulation. The temperature indicated is the furnace temperaure.

The electrolyte powder was prepared by melting, cooling and grinding in a mortar. The electrolyte layer in the cells consisted solely of this powder, while the electrode layer consisted of a mixture of this and other powders. All work for manufacture of the cells was done in atmospheric air without any special precautions to avoid absorption of moisture.

Measurements of pole voltage in the loaded state were made one mixture after the beginning of the load.

EXAMPLE 8

Electrolyte consisted of 80 mole percent $Na_2SO_4$ and 20 mole percent $ZnSO_4$. The anode layer consisted of 50% by weight electrolyte powder and 50% by weight zinc powder. The cathode layer consisted of 40% by weight $MnO_2$, 40% by weight electrolyte powder, and 20% by weight graphite powder. The current take-off of silver wire was charged into the electrode layer. The thickness of the finished cell was 5 mm equally distributed over anode, electrolyte and cathode layer. The cell was tested at a temperature of 380° C. Pole voltage in unloaded state was 1.2 volt. The voltage dropped to 0.8 volt on loading with a 100 ohm resistance.

EXAMPLE 9

Electrolyte consisted of 80 mole percent $Na_2SO_4$ and 20 mole percent $MgSO_4$. The anode layer consisted of 50% by weight magnesium powder and 50% by weight electrolyte powder. The cathode layer consisted of 40% by weight $MnO_2$, 40% by weight electrolyte powder, and 20% by weight powdered graphite. The current take-off of silver wire was charged into the electrolyte layer. The thickness of the finished cell was 6 mm, whereof the two electrodes took approximately 1 mm each. The cell was tested at a temperature of 360° C. The pole voltage in unloaded state thereby was 2.4 volt. Loaded with a resistance of 1000 ohm, the cell had a pole voltage of 1.2 volt.

EXAMPLE 10

The electrolyte consisted of 50 mole percent $Na_2SC_4$ and 50 mole percent $Li_2SO_4$. The anode layer consisted of 45% by weight magnesium powder, 45% by weight electrolyte powder, and 10% by weight graphite powder. The cathode layer consisted of 45% by weight $MnO_2$, 45% by weight electrolyte powder, and 10% by weight graphite powder. The thickness of the finished cell was 3 mm distributed equally over the three layers. The cell was tested at a temperature of 540° C. The pole voltage of the unloaded cell was 2.3 volt. On loading with a 5 ohm resistance, the pole voltage was 1.3 volt.

EXAMPLE 11

The electrolyte consisted of 11 mole percent $Li_2SO_4$, 67 mole percent $Na_2SO_4$, and 22 mole percent $ZnSO_4$. The anode layer consisted of 50% by weight zinc powder and 50% by weight electrolyte powder. The cathode layer consisted of 40% by weight $MnO_2$, 40% by weight electrolyte powder, and 20% by weight graphite powder. The current take-up of silver wire was loaded into the electrode layer. The thickness of the finished cell was 3 mm distributed equally over the three layers. The cell was tested at a temperature of 385° C. The pole voltage in the unloaded state was 1.2 volt. Pole voltage was 0.85 volt on leading with 100 ohm resistance.

EXAMPLE 12

The electrolyte consisted of 7.5 mole percent $CaSO_4$ and 92.5 mole percent $Li_2SO_4$. The anode layer consisted of 50% by weight calcium grindings and 50% by weight electrolyte powder. The cathode layer consisted of 40% by weight $MnO_2$, 40% by weight electrolyte powder and 20% graphite powder. The current take-ups of silver wire were charged into the electrode layer. The thickness of the finished cell was 4 mm, whereof the electrodes constituted 1 mm each. The cell was tested at a temperature of 650° C. Unloaded, the cell had a pole voltage of 2.6 volt. Loaded with a 2 ohm resistance, the pole voltage was 1.7 volt, which corresponds to an output density of 1.1 watt/$cm^3$.

EXAMPLE 13

With use of an electrolyte with the composition 50 mole percent $Li_2SO_4$, 20 mole percent $Ag_2SO_4$, 20 mole percent silver iodide (calculated as $Ag_2I_2$), and 10 mole percent $MgSO_4$, cells were produced that worked at room temperature. The electrolyte powder was prepared by grinding, sintering at 200° C. and regrinding. Pressing of the cells was done in two cycles. The cathode (or anode) tablet was first made in a press with a diameter of 15 mm. This was then placed on a mica disc in a press with 20 mm diameter. The electrolyte powder was then poured over, and last, a layer of anode (or cathode, respectively) mixture. This method was used to avoid short circuiting in the cell during pressing. In a press of insulating material, it should be possible to manage with only one pressing operation. As current take-up on both electrodes, there was a thin layer of graphite.

A typical cell of this kind with anode of 40% by weight silver powder, 40% by weight electrolyte powder, and 20% by weight graphite powder, and a cathode of 40% by weight iodine powder, 40% by weight electrolyte powder, and 20% by weight graphite powder, had a pole voltage of 0.67 volt in the unloaded state. The cathode was 15 mm in diameter and the distance between electrodes was 4 mm. The current voltage characteristic was almost a straight line corresponding to an internal resistance of 350 ohm at a temperature of 23° C.

EXAMPLE 14

A cell made in a corresponding way but with an electrolyte with the composition 47.5 mole percent $Li_2SO_4$, 19 mole percent $Ag_2SO_4$, 19 mole percent silver iodide (calculated as $Ag_2I_2$), 9.5 mole percent $MgSO_4$, and 5 mole percent $Na_2SO_4$, and the anode of 40% by weight $Na_2S$, 40% by weight electrolyte powder, and 20% by weight graphite powder, had a pole voltage of 0.7 volts in the unloaded state at 24° C. Internal resistance was 250 ohm. The distance between electrodes was 3 mm.

The compositions described in the foregoing examples are summarized in Table II, below:

TABLE II

| EXAMPLE | MOLE PERCENT | | | | | | |
|---|---|---|---|---|---|---|---|
| | $Li_2SO_4$ | $Ag_2SO_4$ | $Ag_2I_2$ | $MgSO_4$ | $ZnSO_4$ | $Na_2SO_4$ | $CaSO_4$ |
| 1 | 70 | 15 | 15 | | | | |
| 2 | 50 | 20 | 20 | 10 | | | |
| 3 | 86 | | | 14 | | | |
| 4 | 72 | | | 28 | | | |
| 5 | 72 | | | 28 | | | |
| 6 | 86 | | | 14 | | | |
| 7 | 64 | | | | 36 | | |
| 8 | | | | | 20 | 80 | |
| 9 | | | | 20 | | 80 | |
| 10 | 50 | | | | | 50 | |
| 11 | 11 | | | | 22 | 67 | |
| 12 | 92.5 | | | | | | 7.5 |
| 13 | 50 | 20 | 20 | 10 | | | |
| 14 | 47.5 | 19 | 19 | 9.5 | | 5 | |
| RANGE | 11–92.5 | 15–20 | 15–20 | 9.5–28 | 20–36 | 5–80 | 7.5 |

As to the areas of use for the present solid electrolytes, these are other possibilities aside from that of a source of current. The thermoelectromotive force of sulfate based electrolytes is of the order of magnitude of 1 mv/degree which very well can be used in thermocells of various kinds. Since the resistance is changed very pronouncedly within a limited temperature range, the electrolyte can also be used as an element of a signal generating component in temperature sensing circuits.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An electrochemical cell having a solid electrolyte of high conductivity comprising a mixture of at least two salts of the composition $M_2SO_4$—$Me_xSO_4$ where M is an ion of one or more alkali metals, Ag or a mixture thereof, Me is an ion of a divalent metal or Ag and x is 1 when Me is divalent and 2 when Me is Ag, with the proviso that at least when Me is Ag, the mixture further contains a salt of the composition $Ma_xSO_4$ or $Ma\ Y_z$ where Ma is an ion of an alkali metal, Ag or a divalent metal other than M, Y is a halogen, x is 1 when Ma is divalent and 2 when Ma is an alkali metal or silver and z is 1 when Ma is an alkali metal or silver and 2 when Ma is divalent, and wherein the alkali metal salt is present in the electrolyte salt mixture in an amount of at least 50 mole percent.

2. A cell as in claim 1 wherein the divalent metal ion of the solid electrolyte is Ca, Mg, or Zn.

3. A cell as in claim 1 wherein the divalent metal ion of the solid electrolyte is Ca, Mg or Zn.

4. A cell as in claim 1 wherein the solid electrolyte is a ternary mixture in which ($SO_4$) is the predominant anion and silver halide is provided to stabilize the transformation point of the sulfate structure.

5. An electrochemical cell as in claim 1 having a solid electrolyte of the composition Li—Ag—X—($SO_4$), wherein X is Cl, Br, or I, or mixtures thereof.

6. A cell as in claim 5 wherein the solid electrolyte has the composition $Li_2SO_4$—$Ag_2SO_4$—AgCl.

7. A cell as in claim 5 wherein the solid electrolyte has the composition $Li_2SO_4$—$Ag_2SO_4$—AgBr.

8. A cell as in claim 5 wherein the solid electrolyte has the composition $Li_2SO_4$—$Ag_2SO_4$—AgI.

9. A cell as in claim 1 wherein the solid electrolyte has the composition $Li_2SO_4$—$ZnSO_4$—LiCl.

10. A cell as in claim 1 wherein the solid electrolyte has the composition $Li_2SO_4$—$CaSO_4$.

11. A cell as in claim 1 wherein the solid electrolyte has the composition $Li_2SO_4$—$MgSO_4$.

12. A cell as in claim 1 wherein the solid electrolyte has the composition $Na_2SO_4$—$ZnSO_4$.

13. A cell as in claim 1 wherein the solid electrolyte has the composition $K_2SO_4$—$ZnSO_4$.

14. A cell as in claim 1 wherein the solid electrolyte has the composition $Ag_2SO_4$—$MgSO_4$.

15. A cell as in claim 1 wherein the solid electrolyte has the composition $Li_2SO_4$—$Na_2SO_4$—$MgSO_4$.

16. A cell as in claim 1 wherein the solid electrolyte has the composition $Li_2SO_4$—$Ag_2SO_4$—$MgSO_4$.

17. A cell as in claim 1 wherein the solid electrolyte has the composition $Li_2SO_4$—$Ag_2SO_4$—$Na_2SO_4$.

18. A cell as in claim 1 wherein the solid electrolyte has the composition $Li_2SO_4$—$Ag_2SO_4$—$ZnSO_4$.

19. A cell as in claim 1 wherein the solid electrolyte has the composition $Li_2SO_4$—$Na_2SO_4$—$ZnSO_4$.

20. An electrochemical cell as in claim 1 wherein the solid electrolyte contains from 5 to 92.5 mole percent of at least one alkali metal sulfate and from 7.5 to 36 mole percent divalent metal sulfate.

21. An electrochemical cell as in claim 20 wherein from 15 to 20 mole percent of $Ag_2SO_4$ is substituted for a corresponding amount of alkali metal sulfate.

22. An electrochemical cell as in claim 1 wherein the solid electrolyte contains from 5 to 92.5 mole percent of at least one alkali metal sulfate, 7.5 to 36 mole percent divalent metal sulfate, and 15 to 20 mole percent silver halide.

23. An electrochemical cell as in claim 22 wherein from 15 to 20 mole percent of $Ag_2SO_4$ is substituted for a corresponding amount of alkali metal sulfate.

24. A cell as in claim 1 wherein the proportions of salts in said mixture of salts is such that said mixture of salts has a transformation point in the range of from about room temperature to 572° C.

25. A method of producing an electrochemical cell having a solid electrolyte of high conductivity which comprises preparing a mixture of at least two salts of the composition $M_2SO_4$—$Me_xSO_4$ where m is an ion of one or more alkali metals, Ag or a mixture thereof, Me is an ion of a divalent metal or Ag and x is 1 when Me is divalent and 2 when Me is Ag, with the proviso that at least when Me is Ag, the mixture further contains a salt of the composition $Ma_xSO_4$ or $Ma\ Y_z$ where Ma is an ion of an alkali metal, Ag or a divalent metal other than M, Y is a halogen, x is 1 when Ma is divalent and 2 when Ma is an alkali metal or silver and z is 1 when Ma is an alkali metal or silver and 2 when Ma is divalent, and wherein the alkali metal salt is present in the electrolyte salt mixture in an amount of at least 50 mole persent; converting said mixture into a solid mass; and attaching oppositely-active electrochemical electrodes to said solid mass.

26. A method as in claim 25 wherein the mixture of salts is heated to a temperature above the transition point and then cooled rapidly to produce the solid electrolyte.

27. A method as in claim 26 wherein the mixture of salts is first pressed into a tablet.

28. A method as in claim 25 wherein the mixture of salts is compressed at room temperature into a solid mass to produce a solid electrolyte of high conductivity.

* * * * *